May 15, 1973     J. DE LIGT ET AL     3,733,235

FABRICATION OF LAMINATED STRUCTURAL PANELS

Filed July 22, 1971     4 Sheets-Sheet 1

INVENTORS
JOHN DELIGT
CLIFFORD D. SHELOR

BY
*W.E. Marconett*

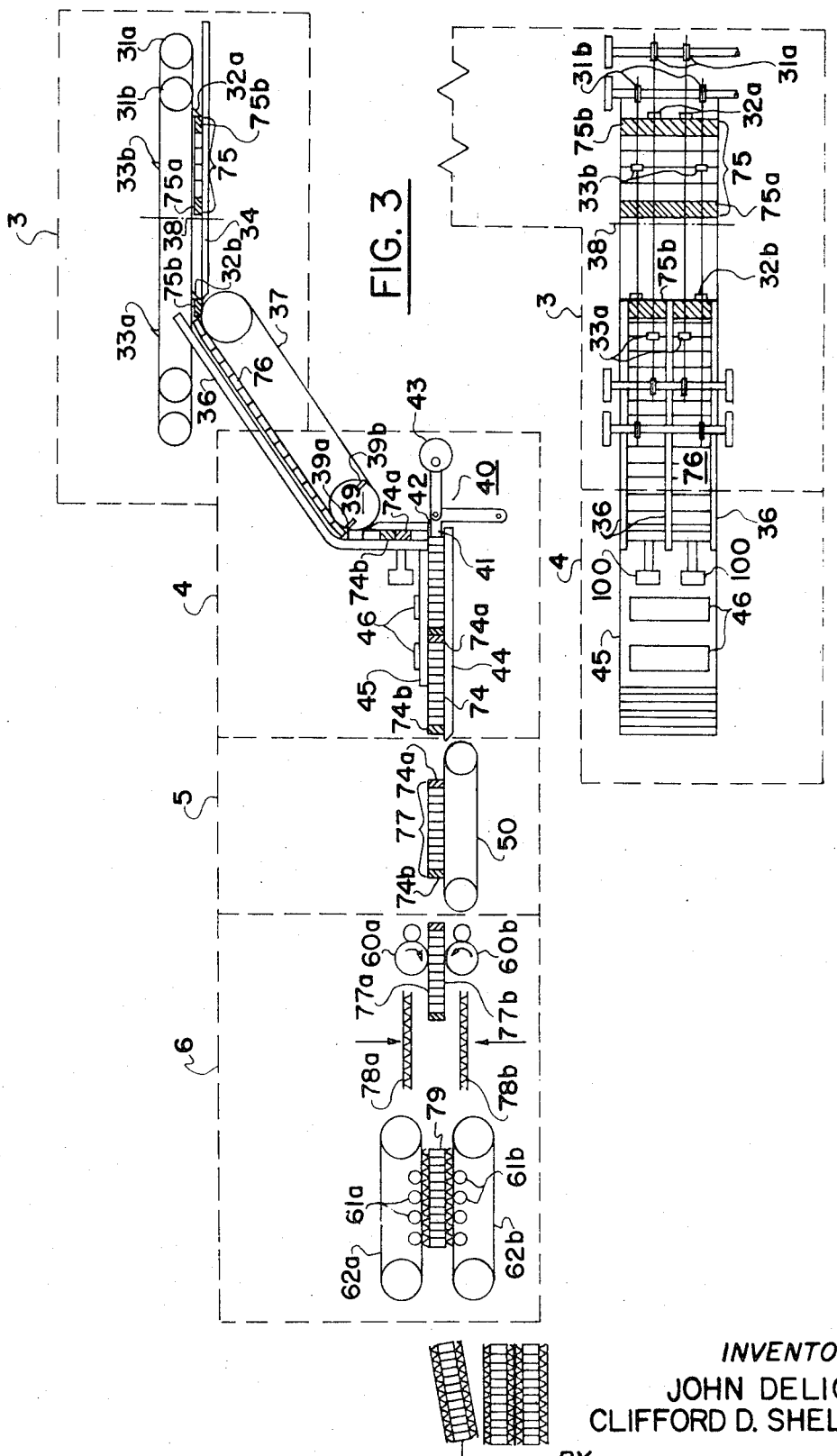

INVENTORS
JOHN DELIGT
CLIFFORD D. SHELOR

United States Patent Office 3,733,235
Patented May 15, 1973

3,733,235
FABRICATION OF LAMINATED STRUCTURAL PANELS
John De Light and Clifford D. Shelor, Covington, Va., assignors to Westvaco Corporation, New York, N.Y.
Filed July 22, 1971, Ser. No. 165,017
Int. Cl. B32b 31/00
U.S. Cl. 156—260
19 Claims

ABSTRACT OF THE DISCLOSURE

Method and apparatus for fabricating high strength to weight ratio structural panels from sheet stock such as corrugated paper board having a major strength plane and direction by slicing strips of said sheet stock along a cutting plane transverse of said major strength plane and direction, applying adhesive to one face of said strips conveying said strips in edge-to-edge alignment to a collimating device, re-aligning said strips in face-to-face contact with each other and with planar parallel alignment of strip edges and applying adhesive setting pressure between adjacent faces.

BACKGROUND OF THE INVENTION

Field of the invention

This invention relates a method and apparatus for continuous, mechanized production of cellular cores for structural panels.

Description of the prior art

Cellular cores are known in the fabrication arts as sheet material management devices whereby structural panels having unusually high strength to weight ratios may be constructed. One such structural panel system comprises an alternating series of corrugated and flat thin sheet elements of solid material laminated together. Orientation of sheet planes and corrugation flute axes in the core elements of such composite panels is such that the centroidal axis providing the largest inertial moment is disposed parallel with the composite panel face plane. In other words, the sheet planes for both, the corrugated and flat elements, are substantially perpendicular to the panel face plane.

When combined with facing sheets secured to the planar surfaces defined by the aligned edges of the afore-described thin sheet elements, the resulting composite is a structural panel of unusually high strength-to-weight ratio. Depending on the material of construction, such panels have valuable utility as aircraft skins, static building panels and even material shipment platforms such as pallet decks.

In the past, utility of such panels has been limited to those applications where material cost was a secondary consideration to performance, a premium being placed on the favorable strength-to-weight ratio of such panels. The many repetitive forming, cutting, collating, collimating, aligning and bonding operations necessary to form the cellular cores for such panels by prior art methods have been slow and expensive.

SUMMARY

The present invention is directed to a method and apparatus for assembling construction elements for cellular cores that is rapid, continuous and adaptable to full mechanization and automation. Although this invention is particularly suitable to paper or thin fiberous board as the elemental material, the adaptability thereof for other ductile construction materials such as aluminum and steel should be obvious.

In accordance with the present teaching, corrugated sheets are adhesively joined with at least one planar facing sheet in a known manner before cutting, as by sawing or shearing, into long, narrow strips. The narrow width dimension of said strips determines the thickness dimension of a finished core and is oriented parallel to the corrugation flute axes, the major strength direction of the corrugated sheet. Said strips are subsequently transferred to a conveyance device where they are fed serially, edge-to-edge, along a direction parallel with said corrugation flute axes, into a colliminating device.

The collimating device comprises a rapidly reciprocating trip-hammer which pushes each strip laterally from the edge-to-edge conveyance plane into face-to-face alignment with the foregoing strip thereby clearing space for the next strip to advance into position against the collimating surface. Each cycle of the trip-hammer is coordinated with a cyclic strip advancing device for urging the next strip in the line thereof into striking position during the trip-hammer retracted half cycle.

At some point between the strip cutting operation and the collimating trip-hammer, adhesive must be applied to at least one face of the strips.

Subsequent to collimating, adhesive pressure and translatory motion rectification means are applied to the face-to-face strip series for a time period sufficient to set the adhesive and distance sufficient to prevent the face-to-face line of strips from resiliently expanding back into interference with the advancement of on-coming strips into the striking position during the retracted half-cycle of the trip-hammer.

Other objects of the invention include the discrete omission of adhesive from at least one strip entering the collimator to facilitate the subsequent segregation of completed core panels from the continuum emerging from the collimator.

To complete the fabrication into finished structural panels, it is only necessary to laminate facing sheets to the respective core faces.

BRIEF DESCRIPTION OF THE DRAWINGS

Relative to the drawing wherein like reference characters designate like or corresponding parts throughout the several views:

FIG. 3 is an elevational schematic of the reoriented strip supply line at cut line III—III of FIG. 1, the collimating operation, separation of the core continuum into discrete core panels and application of panel facing sheets for final finishing.

FIG. 4 is a plan schematic of the reoriented supply and collimating operations of FIG. 3.

DESCRIPTION OF THE PREFERRED EMBODIMENT

Figure 1:
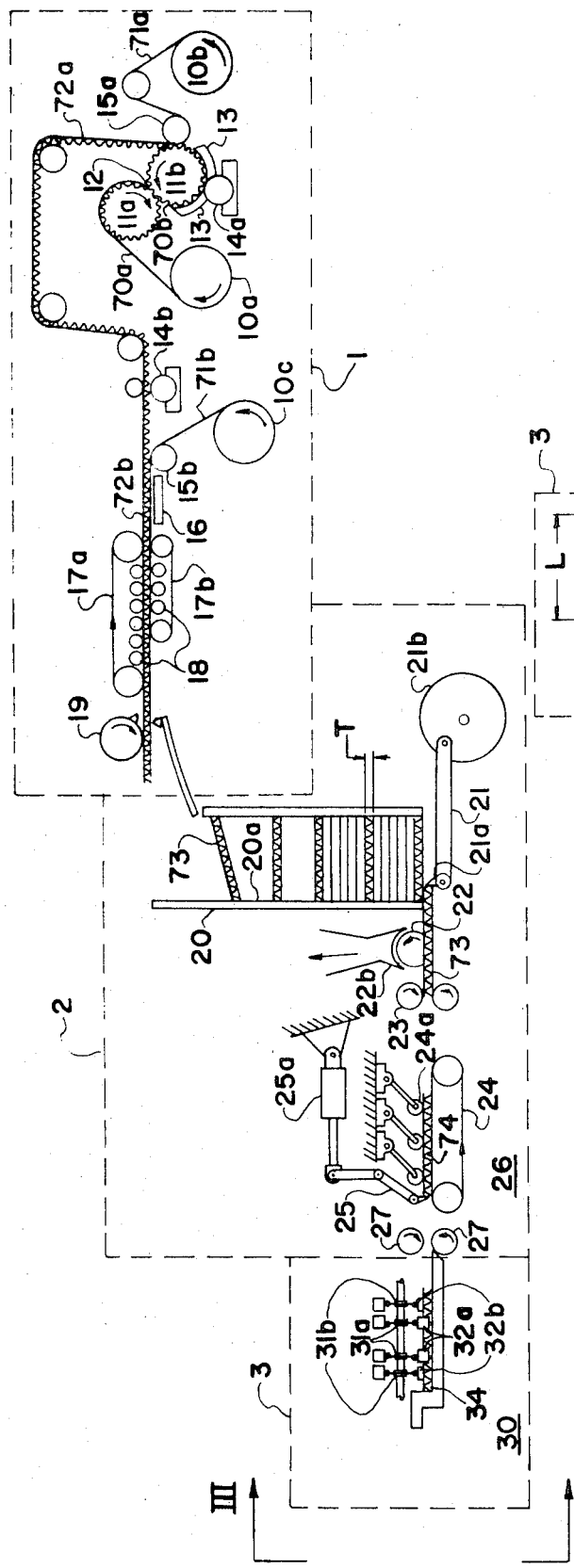
FIG. 1 is an elevational schematic of the corrugated panel fabricating and sawing operations of the present invention.

Relative to the elevation of FIG. 1, there is shown, within the area bounded by the dashed line 1, a corrugated web fabricator for solid sheet materials such as kraft paper or aluminum foil. Corrugated panels 73 of uniform size produced by the corrugated fabricator 1 are deposited in the feed hopper 20 of a strip cutting operation 2 to be cut into strips 74. From the cutting operation 2, the strips 74 are deposited at a direction change station 30 of a collimator feed conveyor 3. From the conveyor 3, the strips 74 are fed as a continuous line into a collimating and core panel fabrication operation 4

(FIGS. 3 and 4) to be reoriented and structurally bound together as an integral core element or panel 77. The continuous series of collimated strips 74 emerging from the core panel fabrication operation 4 is broken into discrete panels at the separation operation 5 in preparation of receiving facing sheets 78a and 78b by the panel face applicator 6.

The corrugated web operation 1 and strip cutting operation 2, respectively, may be performed independently in time and space of the collimating and core panel fabrication operation 4 but are most efficiently executed as antecedent functions.

Starting with the roll 10a (FIG. 1) of solid material sheet stock, web 70a is passed over the corrugating roll 11a and through the nip 12 formed by the meshing involutes of rolls 11a and 11b. Emerging from the nip 12, the corrugated web 70b is held against the involuted surface of roll 11b by retaining fingers 13. Adhesive, such as vegetable glue, is continuously applied to the involute crest lines of one web face by applicator roll 14a. An uncorrugated web 71a is reeled from roll 10b, passed over an idler roll and around nip roll 15a into pressured contact with the glue lines on corrugated web 70b to form a single faced corrugated web 72a. Other idler rolls direct the web 72a into the nip of glue applicator 14b so adhesive may be applied to the corrugation crest lines on the bottom face of web 72a. Reel 10c supplies the uncorrugated web 71b around nip roll 15b into pressured contact with said bottom crest glue lines to secure the remaining face of a double faced corrugated web 72b. Thereafter the web is drawn over a heater platen 16 by a pulling section comprising traction belts 17a and 17b driven between roller platens 18. Rotary knife 19 cuts the double-faced corrugated web 72b into corrugated panels 73 of uniform length and width which may be gravity dropped into feed hopper 20 of the strip cutting operation 2.

The vertical dimensional relationship between the bottom edge of hopper side 20a and the reciprocating lug 21a of the slider-crank feed mechanism 21 is such as to allow only one panel 73 to be sheared from beneath the hopper stack in a single cycle of the crank 21b.

Figure 2:
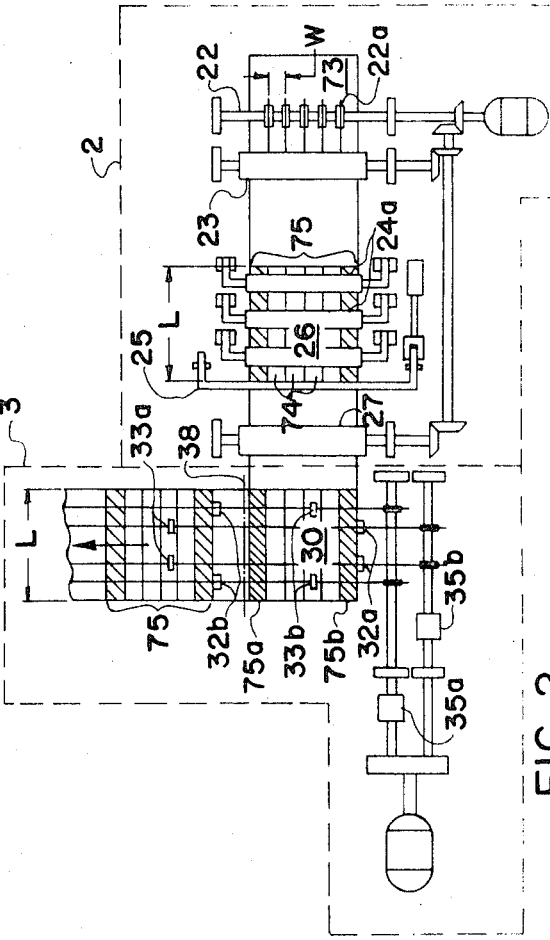
FIG. 2 is a plan schematic of the sawing and direction changing operations of the present invention.

Advancement of a panel 73 by the lug 21b engages the panel with cutting edges of gang saw 22. The spacing W (FIG. 2) between each circular blade 22a is such as to divide the panel 73 into a number of long, narrow, thin strips 74, each of uniform width W, length L and thickness T. Although a serrated circular saw has been found for the present to be the most satisfactory cutting device for kraft paper, one attendant disadvantage of a saw is the immense production of saw dust necessitating a vacuum removal system 22b. Another disadvantage of the circular saw is material wastage from the saw kerf. Depending on the properties of the solid sheet stock 70 and 71 and the related economics, other cutting techniques such as rotary shears, band saws, hydraulic jets or lasers may be utilized since the cutting function is to completely separate each strip 74 from the one next adjacent.

It should also be noted that orientation of the panel 73 relative to the cutting planes of saw 22 is important to achieve optimum product strength. For corrugated panels from the aforedescribed fabricating operation 1, the cutting planes should be perpendicular to the corrugation flutes axes i.e. the major compressive strength direction of panels 73.

Since the stroke of slider-crank mechanism 21 is only sufficient to start the panel 73 through the saw 22, nip rolls 23 are employed to tractionally complete the panel cut pass. As it is not desirable to interrupt the continuity of the panel cut pass, nip rolls 23 rotate constantly to complete all panel cuts started by the slider crank 21.

From the nip of rolls 23, a strip group 75 comprising strips 74 respective to a single panel 73 is deposited on a continuously moving belt conveyor 24 and restrained by weight rolls 24a to same relative orientation as cut. However, selective deployment of the retractable fence 25 by electric or fluid powered linear actuator 25a operates to make the conveyor 24 an effective holding station 26. Fence 25 obstructs the progress of group 75 as belt 24 slips thereunder.

When conditions are correct for receipt of the strip group 75 by one of the endless tensile conveyance lines 31a or 31b at the direction change station 30, the fence 25 is lifted by a functioning of the actuator 25a whereupon the belt conveyor 24 is allowed to advance the group 75 into the nip of constantly rotating discharge rolls 27.

Allowing sufficient time to complete the transfer of strip group 75 from the holding station 26 to the direction change station 30, lugs 32a of the inside running tensile conveyor 31a engage the outermost longitudinal edge of the outermost strip 75b to advance the strip group 75 along the sliding surface 34.

Tensile conveyors 31a and 31b, which may be chains, belts, ropes, etc. running on overhead sprockets or sheaves are each driven independently through respective variable speed—force limiting devices such as torque limiters 35a and 35b. When the control logic explained hereafter releases either of the conveyors 31a or 31b to advance a strip group 75 along the flow direction the conveyor does so with the greatest permissible speed consistent with maintaining the order and alignment of all strips 74 within the group. This speed should be significantly greater than the fastest rate capacity of collimator 4. Accordingly, the leading strip 75a of the group 75 propelled by lugs 32a will overtake the trailing strip 75b of the preceding group propelled by lugs 32b whereupon the speed will be governed by the prevailing rate of the collimator. Since it is highly desirable to advance the series of strips 76 into the collimator 4 in longtiudinal edge-to-edge abutment between respective strips, it is necessary to maintain a constant, light pushing force upon the trailing strip of the series by the respective lugs. These several criteria of variable speed and constant force may be performed by a base mounted, input clutch-brake module specified as EM-180-20-30 B in Master Catalog No. 67 of the Warner Electric Brake and Clutch Co., Beloit, Wis.

After the strip series on the collimator feed line 3 passes under the vertical restraining tines 36, a planar divergence is provided between the respective paths of lugs 32 and 33 and the strip feed plane 34 to allow the withdrawal of a lug set.

In the embodiment shown, each tensile conveyance line 31a and 31b is provided with two sets of peripherally opposite lugs: 32a and 33a; and 32b and 33b, respectively. Therefore, in each line 31a and 31b, one pair of lugs, 33a for example, is advancing toward the direction change station 30 while the other set, 32a, is proceeding away with a strip group 75.

Figure 5:
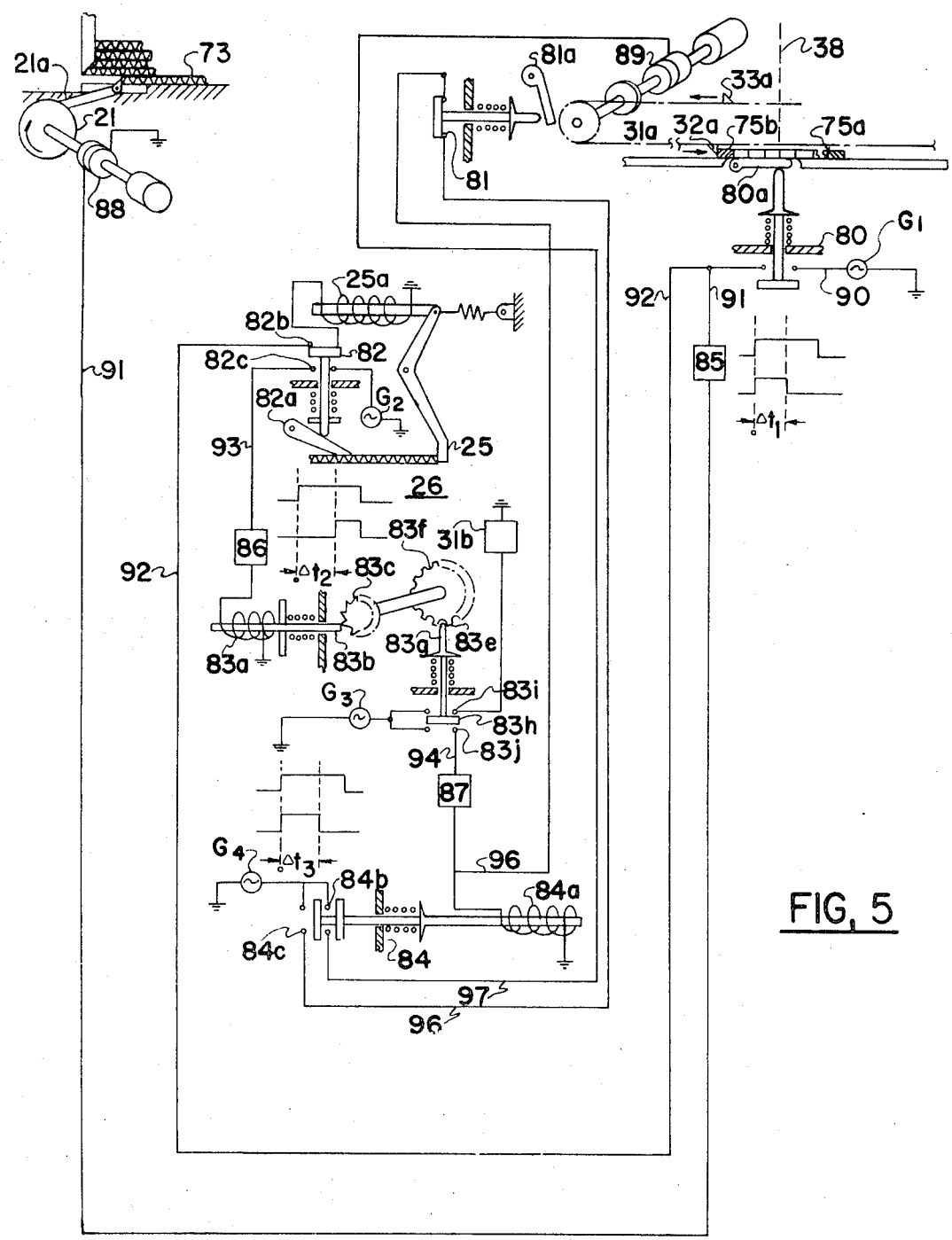
FIG. 5 is a circuitry schematic showing the apparatus and logic for controlling material flow from the corrugated panel hopper to the collimator.

For the purpose of fully automatic coordination of strip cutting operation 2 with the direction changing feed conveyor 3, the control logic and apparatus of FIG. 5 may be utilized. The downstream boundary of change station 30 is defined by a planar path 38 wherein is disposed a normally closed limit switch 80. Obviously, any of the numerous devices available for sensing the presence or absence of the strip material such as photoelectric and sonic proximity switches may be used in lieu of switch 80. It is only important that the passage of a strip group 75 be signified by a distinct electrical signal.

Opening of circuit 90 is occasioned by depression of switch trigger 80a when the lead strip 75a of a group passes thereover. The electrical effect of opening circuit 90 is to discharge circuit 91 thereby reseting time delay relay 85 and the single revolution clutch 88 in the drive train of slider-crank feed mechanism 21.

When the trailing strip 75b of a strip completes passage over switch trigger 80a, clearance of change station 30 is signaled by the switch 80 closure of circuit 90. Energy from source $G_1$ is simultaneously transmitted to circuits 91 and 92.

The bias of $G_1$ present on the input of timing relay 85 in circuit 91 immediately initiates an output conductance to energize single revolution clutch 88 to start one corrugated panel 73 through the saws 22. The output of relay 85 is limited, however, for a time period $\Delta T_1$, less than one complete cycle of crank 21. Without the bias of circuit 91 on the clutch 88 to sustain engagement, disengagement thereof occurs mechanically after one revolution.

If another strip group 75 is waiting at holding station 26, trigger 82a will depress the bus bar of switch 82 into engagement with contacts 82b to complete circuit 92 with the winding of electrical actuator 25a for gate 25. Since the belt conveyor 24 is continuously operating beneath the strip group, movement onto the direction change station 30 thereof begins immediately upon lifting the gate 25. Discharge rolls 27 are also continuously operating thereby assuring the complete delivery of group 75 to change station 30 even after the trailing end thereof passes trigger 82a to open contacts 82b of circuit 92 thereby closing gate 25.

The absence of material at holding station 26 prompts the closure of contacts 82c to complete the circuit 93 with energy source $G_2$. From that moment, time delay 86 starts counting down to $\Delta T_2$, a function of the time required for the foregoing strip group 75 to be completely deposited and settled at change station 30. At the expiration of $\Delta T_2$, relay 86 transmits a single pulse to distributor switch winding 83a and cuts off. The single pulse from relay 86 is sufficient to cycle the linear pawl 83b against one spur of wheel 83c thereby indexing cam 83d from the preceding high surface position 83e to the next low position 83f. Cam follower 83g reciprocates between said cam highs and lows to alternate bus bar 83h between contacts 83i and 83j, completing circuits 95 and 94 with energy source $G_3$, respectively and exclusively.

Circuit 95 includes a control complement for tensile conveyor 31b identical to that for 31a described below. The primary function of distributor switch 83 is, therefore, to select which of the two independently driven tensile conveyors shall carry the next strip group 75.

When distributor switch cam 83d is indexed to a high position 83e relative to the follower 83g, bus bar 83h closes contacts 83j in circuit 94 with energy source $G_3$. The consequent input bias on time delay relay 87 initiates immediate conductance from the output thereof to the winding 84a of holding relay 84. Said relay output is limited, however, for the discrete period of time $\Delta T_3$ necessary to close and lock said holding relay 84.

Actuation of winding 84a closes contacts 84b and 84c between energy source $G_4$ and circuits 96 and 97. Circuit 97 conducts energy to electric clutch 89 in the drive train of tensile conveyor 31a. Circuit 96 provides a continuing conduit of energy from source $G_4$ to winding 84a to hold contacts 84b and 84c closed after time period $\Delta T_3$ has expired and relay 87 has ceased conducting.

The function of holding circuit 96 is to keep conveyor 31a drive train engaged after switch 80 has called it into service. This condition must be sustained until the engaged lug set, 32a for example has released its charge to the belt conveyor 37. At this time, peripherally opposite lug 33a approaches the actuating finger 81a of interrupting switch 81. When opened, switch 81 interrupts the holding circuit 96 for holding relay 84 thereby interrupting the power circuit 97 to clutch 89 and stopping tensile conveyor 31a.

Without the interrupting switch 81, once a tensile conveyor was started there would be no coordination between the placement of a strip group 75 in the direction change station 30 and the location of a lug. Manual surveillance would be required to prevent interferences.

Belt conveyor 37 propels the strip line 76 into the collimator 40 after the withdrawal of tensile conveyor lugs therefrom. Additional thrust to each strip 74 is provided from dogs 39a and 39b which are compliant, centrifugal extensions of belt sheave 39. Dogs 39a and 39b provide a concentrated, positive loading force for collimator breech 41 to assure that a single strip 74 advances completely into the breech 41 during the reciprocatory halfcycle interim that the trip-hammer 42 is withdrawn therefrom.

Although not critical, the line of belt conveyor 37 is a convenient location for one or more adhesive applicators 100 to dispense adhesive to at least one face of strips 74. The characterization of adhesive is used broadly herein and intended to encompass any substance or technique suitable for structurally securing the individual strips 74 together in face-to-face contact subsequent to collimation. Depending on the material properties of the elemental sheet, such substances may include animal, vegetable and casein glues; resorcinols, epoxy, and ureaformaldehyde resins; polyvinyl acetate; plastic; rubber; silicone rubber; and hot melt. In some instances, welding, brazing or soldering may be suitable.

It should be further understood that the primary purpose of face-to-face adhesion between respective strips 74 is the temporary one of preserving structural unity and integrity of a collimated core panel 77 until the faces 78a and 78b can be structurally secured thereto. The adhesive bond between adjacent strips 74 contributes little to the structural strength of the finished panel.

The actual collimating function is performed as an individual strip 74 is thrust edge first into the breech 41 against the surface of table 44 with the corrugation flute axes perpendicular thereto. Trip-hammer 42, cyclically driven by eccentric 43, strikes one face of the strip 74 to push it clear of the breech 41; into intimate, face-to-face contact with the preceding strip; and to advance the entire, collimated series of strips along the table surface 44. In consideration of the above latter function, design account should be taken of the accumulating mass in said colimated series and the consequent inertia thereof as a factor directly related to an individual strip 74 crushing force along an axis perpendicular to the face thereof.

Due to the considerable resilience of corrugated sheet, it is necessary to rectify the motion of the collimated strip series in the vicinity of the breech 41. Otherwise, the series would quickly reach a point where translatory motion under the hammer 42 impact would only or partially be a longitudinal resilient deflection rather than linear indexing and would expand back into the breech 41 during the hammer withdrawal half cycle. This necessary rectification may be simply performed by a thick sheet 45 of moderately soft, amorphous material such as an elastomer of approximately 65 durometer hardness. An alternative to an elastomer sheet may comprise a brush of stiff, fabric pile. With the upstream end of the sheet 45 secured to the collimator frame and the sheet 45 plane bearing normally against the upper surface 77a of the collimated strip series under the force of trimming weights 46, the elastomer tends to flow into the corrugation flute channels open to the core face plane. The shear interface between the collimated series and the elastomer 45 is easily overcome by the force of hammer 42, but provides significant resistance to the resilient expansion of individual strips 74.

A further function provided by the elastomer sheet 45 may be that of a small adhesive setting pressure between the respective strips 74 in the series for a short time following face-to-face contact.

Subsequent to collimation, it is necessary to sever and separate discrete segments from the continuously emerging series line thereof. Such separation is necessary; first to control inertia growth of the series; and second, to finally produce core panels 77 of a practicable, marketable size. One particularly efficient technique for severance is to periodically eliminate adhesive from one or more successive strips. Due to timing criticality, the present invention omits adhesive for a distance equal to the width, W, of two strips 74a and 74b. This technique assures no adhesive on at least one strip. There being no adhesive to bond the collimated interface, a core panel 77 segment may be separated from the emerging line merely by advancing said line from the end of the collimating table 44 onto a separation conveyor 50 traveling at a surface speed greater than the emerging series.

Figure 6:
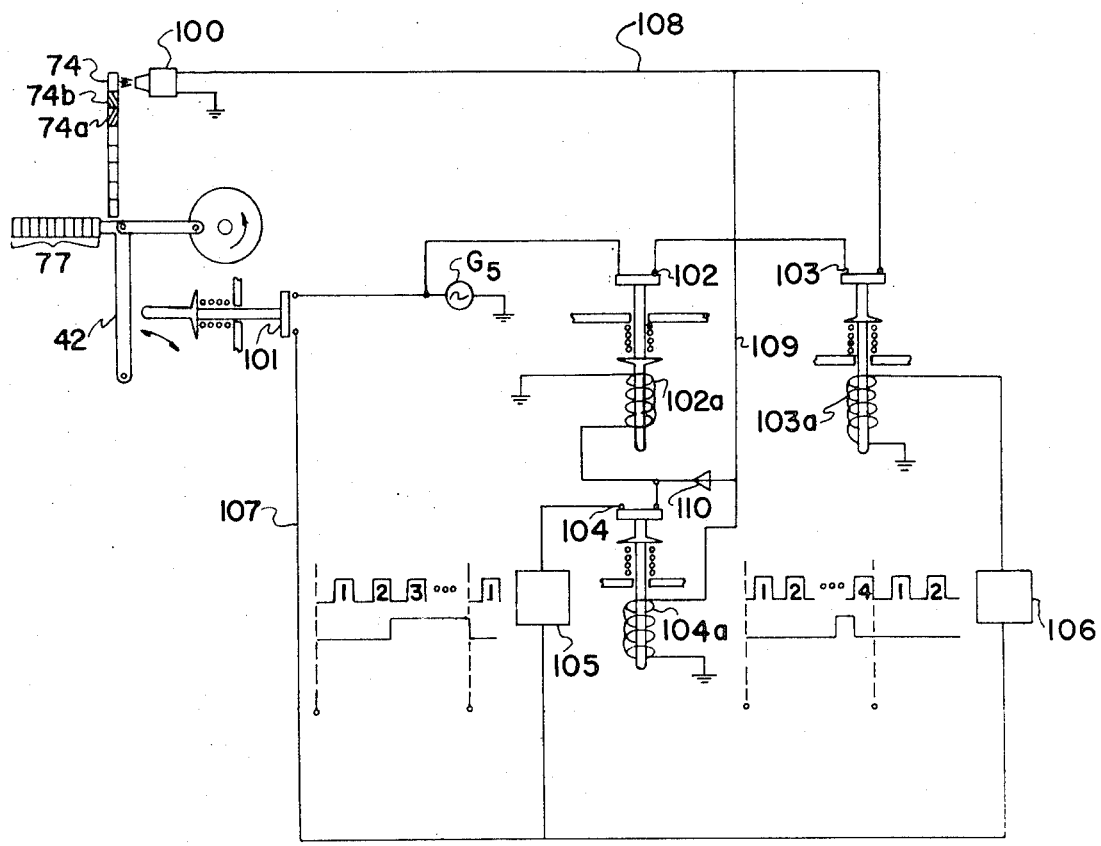
FIG. 6 is a circuitry schematic showing the apparatus and logic for controlling the application of adhesive to the strip supply line.

FIG. 6 illustrates a control logic and apparatus for selectively omitting adhesive from the select two strips 74a and 74b. Starting with series connected relay contacts 102 and 103 in their normal, unenergized state of open and closed, respectively, oscillating trip-hammer 42 momentarily closes the contacts of biased open switch 101 with each cycle thereof to conduct an energy pulse from source $G_5$ through the pulsing circuit 107 to counting relays 105 and 106. Upon receiving two pulses following reference state time=0, counting relay 105 starts to conduct. Since reset relay 104 is normally (unenergized) closed, the output of counting relay 105 is conducted to winding 102a of normally (unenergized) open power relay 102 to close the contacts thereof. Diode rectifier 110 prevents the same signal from energizing winding 104a to prematurely open contacts 104.

Upon the closure of contacts 102, power circuit 108 between energy source $G_5$ and adhesive applicator 100 is completed to start the application of same to the strip faces.

Also energized by power circuit 108 is holding circuit 109 which energizes winding 104a to open contacts 104 to discharge the output of relay 105 and prepare same for resetting. Simultaneously, energy from circuit 109 is conducted to winding 102a to hold contacts 102 closed.

Continuous counter 106 also receives the pulse of circuit 107 and is set to count that number of pulses, N, equal to the desired number of strips 74 in a core panel 77. Having received N pulses, counter 106 transmits a single energization pulse to winding 103a and resets to resume the N counts. The output pulse to 103a opens contact 103 for a sufficient period to de-energize windings 102a and 104a thereby causing contacts 102 and 104 to open and close, respectively. Although contacts 103 immediately close again, power circuit 108 is left open due to return of contacts 102 to the normal open state. Therefore, adhesive applicator 100 cuts off.

When relay contacts 104 close due to the opening of circuit 108 at contacts 103, the resetting of counter 105 is complete and the cycle starts over.

At this point, fabrication of a core panel 77 is complete. Although face panels 78a and 78b are normally applied to upper and lower core surfaces 77a and 77b, respectively, to complete a laminated structural panel 79, like the strip sawing operation, the face application step may be performed separately in time and space. For maximum efficiency, however, each panel 77 may be conveyed directly from the separation conveyor 50 into an adhesive application nip between rolls 60a and 60b. Upon emerging from the nip of rolls 60a and 60b, face panels 78a and 78b are applied to the respective core faces 77a and 77b. These face panels 78a and 78b may, like panels 73, be continuously emerging products of another corrugated web fabricator such as 1 of FIG. 1. If face panels 78a and 78b are of corrugated stock, optimum panel strength may be derived by orienting the flute axes thereof perpendicular to the interface planes between strips 74.

Subsequent to facing with panels 78a and 78b, as a final step, the structural panels 79 are conveyed on traveling belt surfaces 62a and 62b between opposing pressure platens 61a and 61b to set the face panel adhesive.

A prototype machine of the aforedescribed type was designed, assembled and tested in the Covington Research Center of the Westvaco Corporation, Covington, Va., and achieved a sustained linear core output 18.75 feet per minute starting with ⅜ inch thick, double face, A/A flute, 42 pound kraft paper corrugated board stock. At this production rate, trip-hammer 32 was cycling at the rate of 600 strokes per minute.

Intermittent production of 26.5 feet per minute at 850 hammer strikes per minute was achieved without difficulty. Sustained production at this higher rate presents no unexpected difficulties and should be readily achieved by adherence to sound machine design practice for the cyclical forces and rates involved.

In consideration of the foregoing disclosure we claim the following new and unobvious.

We claim:

1. Apparatus for fabricating structural panels from sheet stock having a major strength plane and direction, said apparatus comprising:

first conveyor means for translating said sheet along a first plane and direction substantially parallel with and perpendicular to, respectively, said major strength plane and direction;

cutting means adjacent said first conveyor means for severing said sheet stock into strips of uniform width along cutting planes substantially perpendicular to said major strength plane and direction, said strips having opposite edges planar parallel with said cutting plane and opposite faces planar parallel with said first plane;

second conveyor means adjacent said cutting means for transferring said strips in edge-to-edge serial alignment along a second direction substantially parallel with said major strength direction;

adhesive applicator means adjacent said second conveyor means for depositing adhesive on at least one face of said strips; and collimating means disposed at the transfer terminal end of said second conveyor means for serially orienting said strips in face-to-face juxtaposition and planar alignment of respective leading edges relative to said second direction.

2. Apparatus as described by claim 1 wherein said sheet stock comprises corrugated paperboard, said major strength direction being parallel with corrugation flute axes and said major strength plane defined as containing a plurality of said flute axes.

3. Apparatus as described by claim 1 wherein said collimating means comprises cyclically striking hammer means for serially striking each strip on one face thereof as said leading edge thereof engages a second planar surface to translate said strip along a third direction substantially perpendicular to said major strength plane and direction.

4. Apparatus for fabricating structural panels from sheet stock having a major strength plane and direction, said apparatus comprising:

first conveyor means for translating said sheet stock along a first plane substantially parallel with said major strength plane and in a first direction substantially perpendicular to said major strength direction;

cutting means for severing strips from said sheet stock along uniformly spaced cutting planes substantially parallel to said first direction and substantially perpendicular to said major strength plane, said strips having opposite edges planar parallel with said cutting plane and opposite faces planar parallel with said first plane;

second conveyor means for transferring said strips in edge-to-edge alignment from said first direction to a second direction, said second direction being substantially parallel with said major strength direction;

adhesive applicator means adjacent said second conveyor means for depositing adhesive on at least one face of said strips;

third conveyor means having planar surface means substantially perpendicular to said second direction, said second conveyor means sequentially depositing said strips on said third conveyor means with the leading edge thereof abutting said planar surface means, said third conveyor means also comprising motion inducing means for translating said strips along said planar surface means in a direction substantially perpendicular to said major strength plane and direction and in face-to-face juxtaposition with serially adjacent strips; and adhesive setting pressure means adjacent said third conveyor means for inducing compressive forces within said face-to-face adjacent strip series.

5. Apparatus as described by claim 4 wherein said motion inducing means comprises cyclically striking hammer means.

6. Apparatus as described by claim 5 wherein said hammer means comprises striking face means for cyclically and sequentially striking one face of each strip, advancing same along said third conveyor planar surface means into face-to-face contact with a preceding strip, and advancing a plurality of preceding strips linearly along said third conveyor surface means.

7. Apparatus as described by claim 6 wherein said adhesive setting means also comprises motion rectification means for restraining said strips from reverse movement along said third conveyor planar surface means during a portion of said hammer cycle that said striking face means is withdrawn from a respective strip.

8. Apparatus as described by claim 4 wherein said adhesive setting means comprises a sheet of soft, amorphous material juxtapositionally disposed against a surface formed by the edges of said strip opposite from said third conveyor planar surface means.

9. Apparatus as described by claim 4 additionally comprising strip counting and adhesive applicator control means whereby adhesive is cyclically omitted from at least one strip following the application of adhesive to a predetermined number of preceding strips.

10. Apparatus as described by claim 9 additionally comprising fourth conveyor means for separating individual structural panels formed by a series of said predetermined number of strips emerging from said adhesive pressure means, said separation occurring at the adhesive-free interface between adjacent strips.

11. Apparatus for collimating a continuous series of long, narrow and thin sheet material strips having substantially parallel edges and faces of uniform length, width and thickness, said apparatus comprising:
first conveyance means for serially translating said strips in a first plane parallel with the face planes thereof, in a direction parallel with the width edge thereof, and in edge to edge abutment of the longitudinal edges thereof;
adhesive applicator means disposed adjacent said first plane for depositing adhesive on at least one face of said strips;
restraint means for restricting movement of said strips in a direction perpendicular to said face plane;
second conveyance means for sequentially thrusting at least one of said strips into collimating breech means with a force greater than provided by said first conveyance means;
reciprocating hammer means for sequentially striking each strip on one face thereof and translating each strip along a second plane and direction substantially perpendicular to said face and into face-to-face contact with a preceding strip; and motion rectification means for restraining said strips from reverse movement back into said collimating breech means after said hammer means is withdrawn therefrom.

12. Apparatus as described by claim 11 wherein said adhesive applicator means additionally comprises strip counting and control means whereby adhesive is cyclically omitted from at least one strip following the application of adhesive to a predetermined number of strips.

13. Apparatus as described by claim 12 additionally comprising third conveyance means for separating the series of face-to-face adhesively bonded strips emerging from said collimating breech means into discrete groups.

14. A method of fabricating structural panels from sheet stock having a major strength plane and direction, said method comprising:
conveying said sheet stock along a first plane and direction substantially parallel with and perpendicular to, respectively, said major strength plane and direction;
severing strips of uniform width from said sheet stock along cutting planes substantially perpendicular to said major strength plane and parallel with said first direction, each strip having opposite parallel planar edges and faces;
applying adhesive to at least one face of respective strips;
serially conveying said strips along a second planar surface and direction in edge-to-edge and face-to-surface alignment;
serially depositing said strips on a third planar surface in face-to-face and one edge-to-planar surface juxtaposition;
conveying said face-to-face series of said strips along said third planar surface in a third direction substantially perpendicular to said major strength plane; and
compressing said face-to-face series of strips along an axis parallel with said third direction.

15. A method as described by claim 14 further comprising cyclic omission of adhesive from at least one strip following application to a predetermined number of same.

16. A method as described by claim 15 further comprising segregation of adhesively unitized groups of face-to-face strips following said compression step.

17. A method as described by claim 16 wherein said groups separate along a plane dividing said adhesive deprived strip faces.

18. A method as described by claim 14 wherein said conveyance along said third direction is motivated by sequentially striking each strip on and normally to one face thereof.

19. A method as described by claim 18 further comprising rectification of said third direction motion.

References Cited
UNITED STATES PATENTS 2,475,789   7/1949   Kunz _____ 156—260

DOUGLAS J. DRUMMOND, Primary Examiner

U.S. Cl. X.R.

156—264, 512